United States Patent
Kong et al.

(10) Patent No.: US 7,324,698 B2
(45) Date of Patent: Jan. 29, 2008

(54) ERROR RESILIENT ENCODING METHOD FOR INTER-FRAMES OF COMPRESSED VIDEOS

(75) Inventors: Hao-Song Kong, Newton, MA (US); Wei-Ying Kung, Los Angeles, CA (US); Anthony Vetro, Cambridge, MA (US); Huifang Sun, Billerica, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 861 days.

(21) Appl. No.: 10/717,679

(22) Filed: Nov. 20, 2003

(65) Prior Publication Data

US 2005/0111743 A1    May 26, 2005

(51) Int. Cl.
*G06K 9/36* (2006.01)
(52) U.S. Cl. .................. 382/236; 382/235
(58) Field of Classification Search ........ 382/232–236, 382/275; 375/240.13, 240
See application file for complete search history.

(56) References Cited

U.S. PATENT DOCUMENTS

| | | | |
|---|---|---|---|
| 5,737,022 A | 4/1998 | Yamaguchi et al. | |
| 5,912,707 A | 6/1999 | Kim | |
| 6,128,339 A | 10/2000 | Park | |
| 6,512,795 B1 | 1/2003 | Zhang et al. | |

OTHER PUBLICATIONS

Kung et al. ("A dynamic error concealment for video transmission over noisy channel", Global Telecommunications Conference, 2002. GLOBECOM '02. IEEE, Publication date: Nov. 17-21, 2002, pp. 1767-1773)*
Cen et al., "*Decision Trees for Error Concealment in Video Decoding*," IEEE Transactions on Multimedia, vol. 5, No. 1, Mar. 2003.
Lee et al., "*Multiframe Error Concealment for MPEG-Coded Video Delivery Over Error-Prone Networks*," IEEE Transactions on Image Processing, vol. 11, No. 11, Nov. 2002.

* cited by examiner

*Primary Examiner*—Duy M. Dang
(74) *Attorney, Agent, or Firm*—Dirk Brinkman; Clifton D. Mueller; Gene V. Vinokur

(57) ABSTRACT

A method encodes an inter-frame of a compressed video, the inter-frame including multiple macroblocks in a predetermined order. Each macroblock has an associated motion vector. For each current macroblock in the predetermined order, a set of near macroblocks are identified. An index is assigned to each near macroblock. A difference between the motion vector of the current macroblock and the motion vector of each near macroblocks is determined. The indices of the near macroblocks are then sorted in order of the differences and appended to the inter-frame.

9 Claims, 6 Drawing Sheets

FIG. 3

ERROR RESILIENT ENCODING METHOD FOR INTER-FRAMES OF COMPRESSED VIDEOS

FIELD OF THE INVENTION

The invention relates generally communicating compressed videos over unreliable channels, and more particularly providing error resilient encoding of inter-frames for compressed videos.

BACKGROUND OF THE INVENTION

Videos are usually compressed to reduce the bit rate while transmitting the video over communication networks. For any communication network, errors are introduced inevitably into the compressed video bit stream due to channel noise. Even a single bit error can lead to objectionable visual distortion at the receiver. In some cases, the decoding can fail completely due to variable length coding (VLD). In addition, motion compensated prediction causes error propagation in subsequent frames after any corruption in the compressed video.

Therefore, it is very important to have an error resilient encoding and error concealment during decoding for compressed video transmitted over error-prone channels. Error resilient encoding provides redundancy, and error concealment 'hides' errors. The concealing essentially estimates a replacement value for lost information be it pixel intensities or motion vectors. In the art, the estimated value is said to "conceal" the error.

Many methods are known for error resilient encoding and error concealment during decoding. Those methods can be divided into three main approaches: spatial, temporal, and frequency. There is also a hybrid method of these three main categories, see Cen et al., "Decision Trees for Error Concealment in Video Decoding," IEEE Transactions on Multimedia, Vol. 5, No. 1, March 2003, Lee et al., "Multiframe Error Concealment for MPEG-Coded Video Delivery Over Error-Prone Networks," IEEE Transactions on Image Processing, Vol. 11, No. 11, November 2002, Zhang et al., "A Cell-Loss Concealment Technique for MPEG-2 Coded Video," IEEE Transactions on Circuits and Systems for Video Technology, Vol. 10, No. 4, June 2000.

For spatial error concealment, intra-frame interpolation is the most common method. Intra-frame interpolation uses available neighboring macroblocks (MB) to replace a missing or corrupt macroblock. If the neighboring blocks on all four sides of the missing macroblock are available, then missing pixels can be concealed with bilinear interpolation from the four nearest pixels that are not corrupted.

Other strategies exist. For example, directional interpolation seeks to preserve edges. Those methods either have blurred effect on the reconstructed image or high computational complexity. They are not suitable for real-time applications.

In temporal error concealment, motion compensation prediction is the most common approach. Due to a higher correlation in the temporal domain than the spatial domain, most concealment methods focus on motion vector recovery so that a lost macroblock can be motion-compensated from a reference frame. The lost motion vectors can be replaced by redundant motion vectors, zero vectors, vectors from spatially or temporally adjacent macroblocks, or the average or median of motion vectors of adjacent macroblocks.

However, all of above approaches suffer from poor concealment quality after false recovery happens for missing motion vector. Even when a corrupted macroblock is surrounded by correctly decoded macroblocks, the decoder cannot determine which neighboring motion vector would provide a good concealment.

In frequency concealment, discrete cosine transform (DCT) coefficients of missing macroblocks are estimated using the corresponding DCT coefficients of neighboring blocks. Those methods usually attempt to estimate low frequency coefficients. Therefore, those methods have the same effects as the spatial concealment methods.

U.S. Pat. No. 6,512,795 B1, "Error concealment for video services," issued to Zhang et al. on Jan. 28, 2003, describes a motion vector estimation method for error concealment. That method exploits temporal correlation in the estimation process. A full search is performed within a previous frame for a best match to the available lines of decoded pixels from the current frame. That method has high computational complexity and is not feasible for real-time video transmission, especially in a high error rate situation.

U.S. Pat. No. 6,128,339, "Apparatus and method for masking video data errors," issued to Park, on Oct. 3, 2000, describes a method for error detecting and concealing. That system includes two buffers for storing video data. The first buffer stores the reference frame and the second buffer stores the current frame. When an error is detected at a location, the method copies the video data stored at the location in the first frame buffer to the same location in the second frame buffer to conceal the errors. Then, the error detector updates the first frame buffer with the second frame, reads the video data into the second frame buffer and repeats the error detection process. That method introduces mismatching errors especially for a video with excessive motion.

U.S. Pat. No. 5,912,707, "Method and apparatus for compensating errors in a transmitted video signal," issued to Kim, on Jun. 15, 1999, and U.S. Pat. No. 5,737,022, "Motion picture error concealment using simplified motion compensation," issued to Yamaguchi et al., on Apr. 7, 1998, also describe error detecting and concealing. Similar to the above patent, they reconstruct the current frame from motion vectors for the current frame and a reconstructed preceding frame. That method includes the steps of detecting a lost block containing errors, providing pixel values of neighboring blocks of the lost block in the reconstructed current frame and motion vectors, generating a compensation block based on the motion vectors for the neighboring blocks, and providing the compensation block as a substitution block for concealing the lost block.

Most of the above methods focus on utilizing motion vectors and motion compensation methods for inter-frame error concealment. As stated before, those methods suffer from either poor concealment quality when false recovery happens for a missing motion vector, or slow concealment because of full search computation.

Some of the prior methods describe intra-frame error concealment, but they either introduce large estimation errors to the reconstructed image or have high computational complexity.

FIG. 1 shows a typical prior art error concealment process for a lost 16×16 macroblock (MB) 100 of an intra-frame of a compressed video. The 16×16 pixels are conventionally arranged in a rectangular array. In FIG. 1 there are concealed pixels 101, candidate pixels 102, a current pixel 103, and lost pixels 104. The concealed pixels have previously been recovered, and the lost pixels are yet to be concealed. The current pixel to be concealed is recovered from the nearest candidate pixels along outer boundaries of adjacent macroblocks. In the example, the nearest candidate pixels in the adjacent macroblock are directly above, below, to the left and to the right of the current pixel, but in the adjacent blocks. The intensity of the candidate pixels can be combined in some weighted manner to determine the value of the current pixel to be concealed.

The concealment is performed in raster scan order from upper left corner of the MB to the lower right corner of the MB. Pixels near the top of the MB are concealed earlier than those near the bottom. However, concealment in this way gives large estimation errors because the candidate pixels 102 are generally far away from the pixels to be concealed, i.e., along outer boundaries of neighboring macroblocks.

Given the above prior art, there is a need to provide new encoding and decoding methods compressed videos transmitted over error prone networks.

SUMMARY OF THE INVENTION

A method encodes an inter-frame of a compressed video, the inter-frame including multiple macroblocks in a predetermined order.

Each macroblock has an associated motion vector. For each current macroblock in the predetermined order, a set of near macroblocks is identified. An index is assigned to each near macroblock.

A difference between the motion vector of the current macroblock and the motion vector of each near macroblocks is determined.

The indices of the near macroblocks are then sorted in order of the differences and appended to the inter-frame.

BRIEF DESCRIPTION OF THE DRAWINGS

FIG. 3 is a block diagram of indexes motion vectors for error resilient encoding according to the invention;

DETAILED DESCRIPTION OF THE PREFERRED EMBODIMENT

Our invention provides error resilient encoding for inter-frames, and error concealing decoding for intra-frames of compressed videos.

The encoding method adds redundant motion vectors to the compressed video bit stream. The redundant vectors are in the form of indices at the end of each inter-frame. In case of an error, a decoder can easily restore the motion vectors from these indices to conceal the error.

The decoding method operates in the spatial-domain on intra-frames. The method restores recursively pixels from previously concealed pixels in the same macroblock. This is contrasted with the prior art restoration from neighboring blocks.

These two methods, in combination, can improve the quality of a decoded compressed video received via a noisy channel. The methods are particularly suitable for real-time streaming of compressed videos.

Error Resilient Encoding for Inter-Frames

As stated above, the prior art methods typically select candidate motion vectors for concealment by using a boundary matching process. There are two problems with matching processes. First, the complexity cost of the decoder is increased by the searching and mean square/absolute error calculation. This decreases the throughput of the decoder so that the decoder cannot be used for real-time systems. Second, the process does not guarantee that the selected motion vectors are pertinent, within a limited range of search.

Therefore, we provide an error resilient encoding method for inter-frames, so that errors in decoded inter-frames can be concealed during the decoding. The redundancy information is added at the end of the encoded frame as follows. A predefined code can separate the redundant motion vector information from the preceding portion of the video bit stream for each frame.

Figure 2:
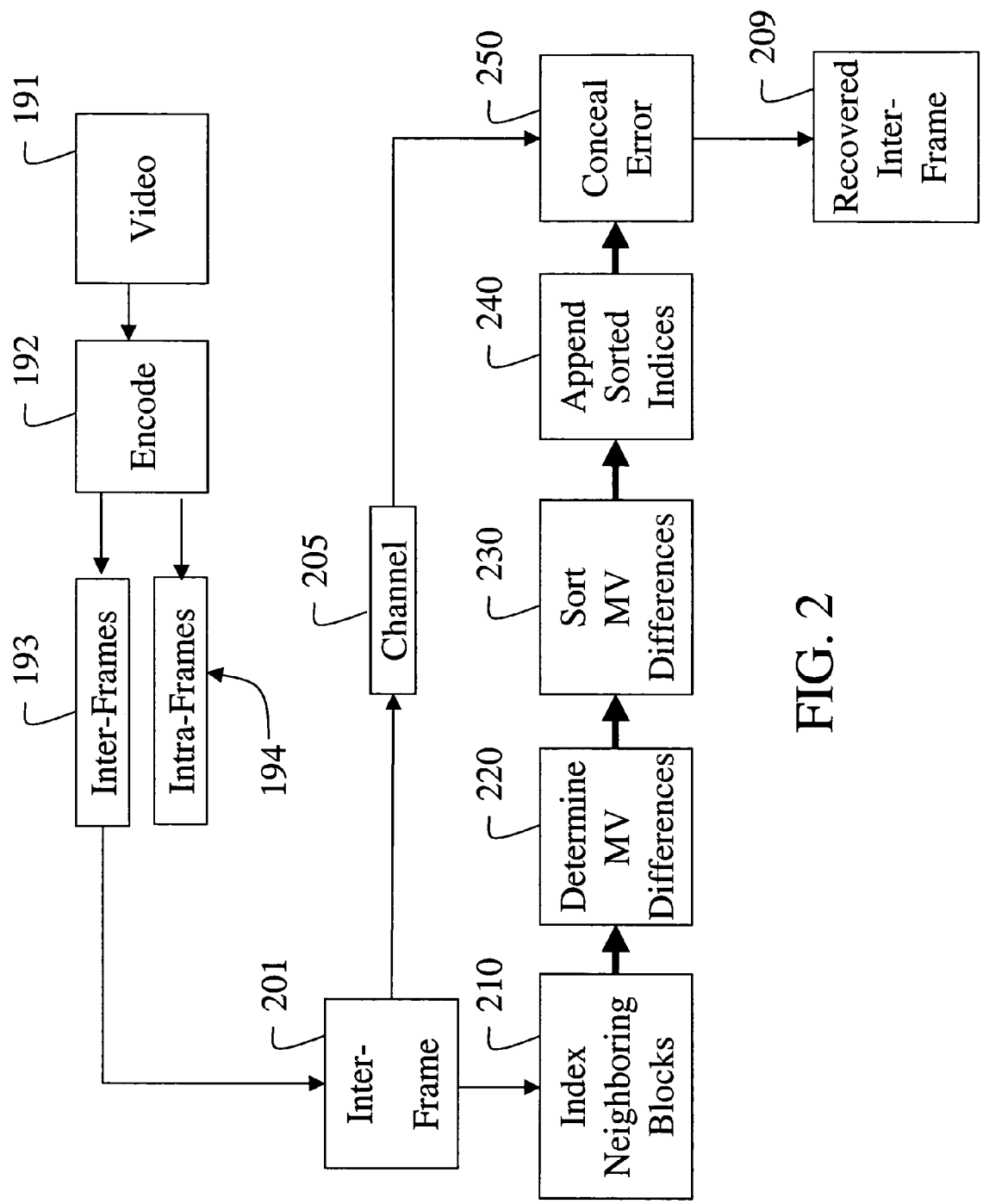
FIG. 2 is a block diagram of error concealment of inter-frames according to the invention.

FIG. 2 shows the error resilient encoding method for generating the redundant information according to the invention.

The input to the process is a video 191. The video is encoded 192 into inter-frames 193 and intra-frames 194 using conventional compression techniques, for example, MPEG. Each inter-frame 201 is further processed as follows.

For optional completeness, macroblocks along the edges of the inter-frame can be replicated adjacently on the outside of the frame to facilitate the processing of edge blocks.

Process the macroblocks of each inter-frame 201 in a raster scan order as follows.

Figure 3:
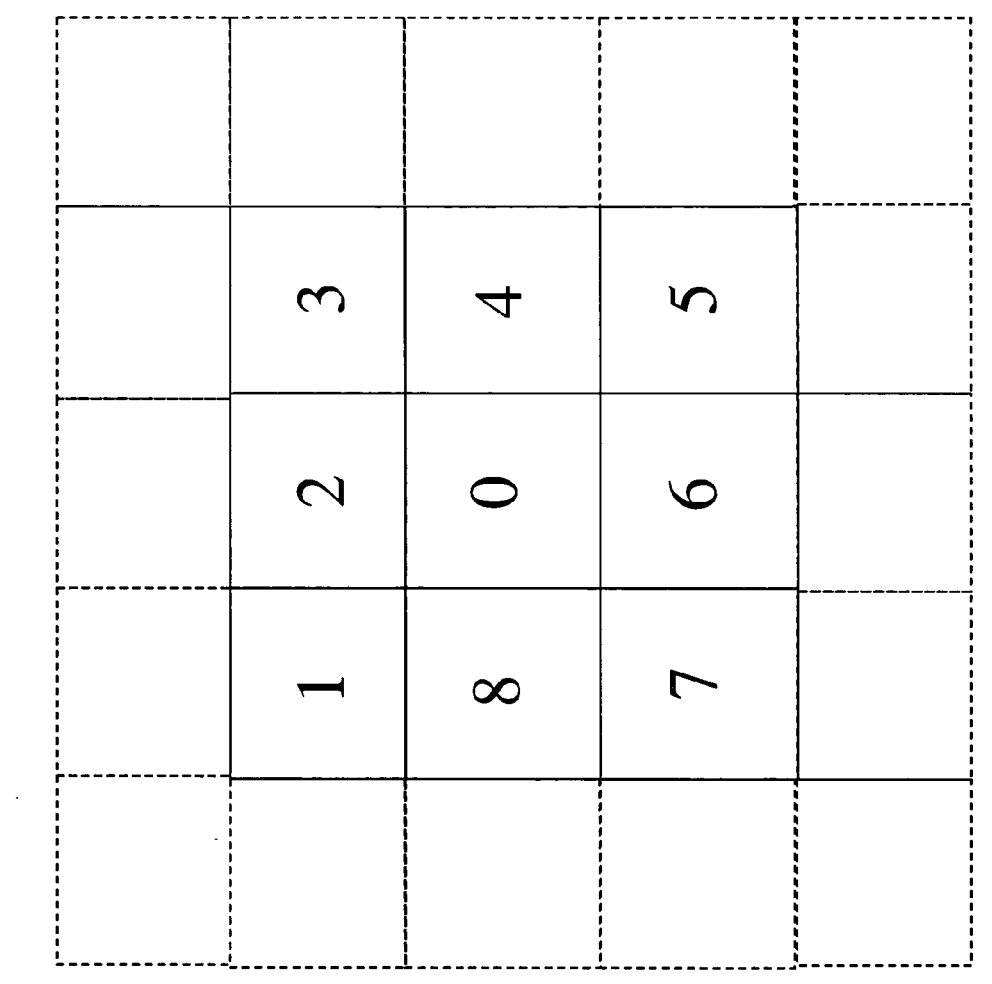

As shown in FIG. 3, indices 1 to 8 are assigned 210 to a set of macroblocks near the current macroblock block 0 being processed. Here, 'near' means immediately adjacent macroblocks. Additional 'near' blocks can also be considered for indexing. For example, the next sixteen blocks shown dotted in FIG. 3. These blocks are immediately adjacent to the above set of macroblocks 1-8. In this case, the set of near blocks has 24 macroblocks. The 'near' macroblocks can be selected in a number of different ways. The presumption is that the motion in 'near' macroblocks is probably like the motion in the current macroblock being processed.

Determine 220 a difference between the motion vector (MV) of the current block 0 and the motion vector of each adjacent indexed block. The difference between the two motion vectors can be in terms of the mean squared or absolute error.

The MV difference are sorted 230 in a small to large order, and the indices of the corresponding macroblocks are appended as redundant information in the sort order at the end of the inter-frame. A separator code can be used to indicate the start of the redundant index information appended at the end of the conventional encoded bits of the inter-frame. For eight blocks, the indices can be expressed in three bits. Therefore, the redundant information for each macroblock consumes only twenty-four bits in this case.

Concealing Errors in Decoded Inter-Frames

Some time later, the inter-frame 201 is transmitted through a noise channel 205, and perhaps, errors are detected during the decoding.

Therefore, the decoder operates on the decoded intra-frame as follows. If no error occurs in the inter-frame, ignore the redundant information. If a MB is lost, then retrieve the first corresponding index, and use the indexed motion vector to conceal 250 the error in the recovered frame 209. The indexed motion vector has the least difference when compared to the motion vector of the lost block.

If the first index is lost, then use the motion vector of the next indexed block, and so forth. If all indexed blocks are lost, then use a conventional concealment process, such as a boundary matching algorithm, as described above, to conceal the error in the recovered frame.

Concealing Errors in Decoded Intra-Frames

Figure 1:
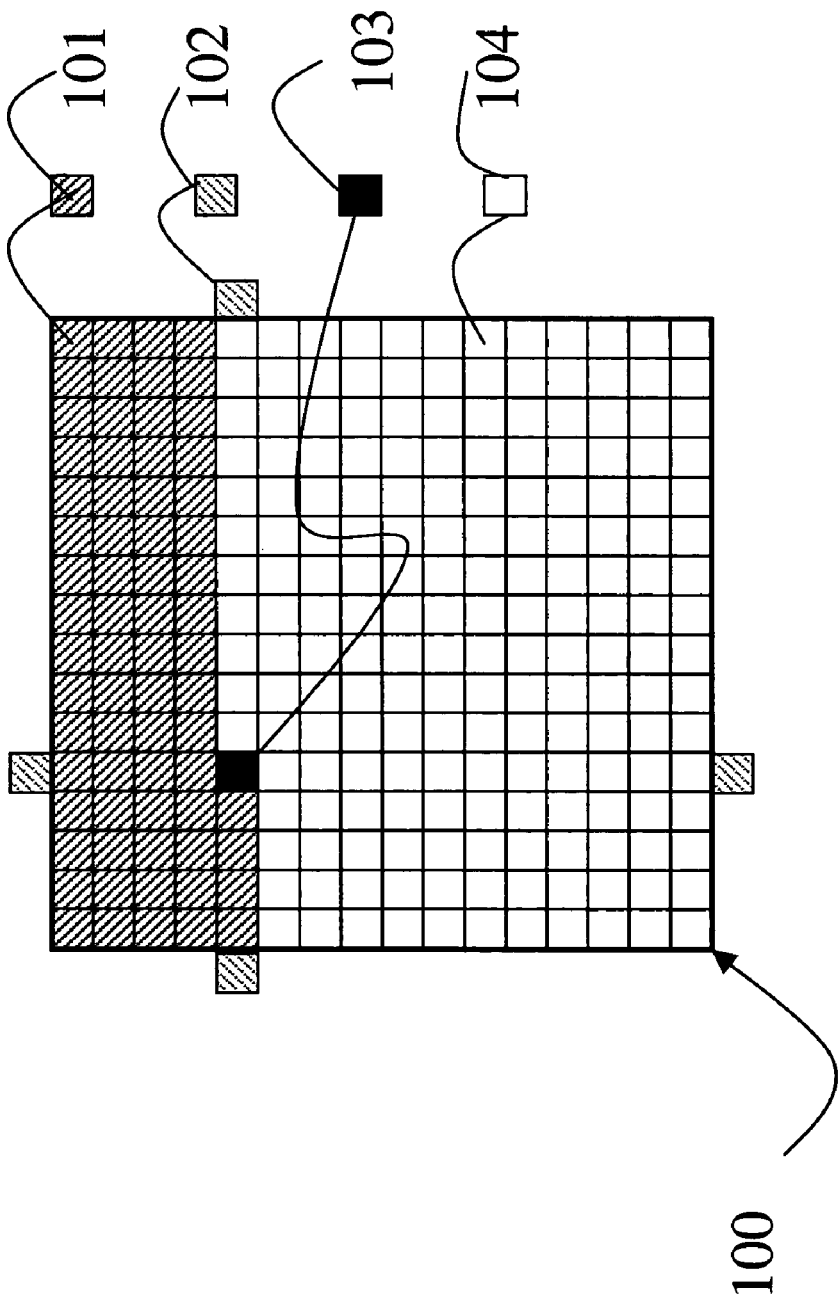
FIG. 1 is a block diagram of a prior art intra-frame error concealment process.

Our method for concealing errors in decoded intra-fames is based on the premise that the best pixels to use to conceal lost pixels are nearby pixels. The prior art only uses candidate pixels from adjacent macroblocks, see FIG. 1 above.

Other than pixels along the edge of the lost macroblock, we use concealed pixels from the recovered block itself. We first conceal the pixels along the border, and then conceal the remaining pixels from the already concealed pixels.

Figure 4:
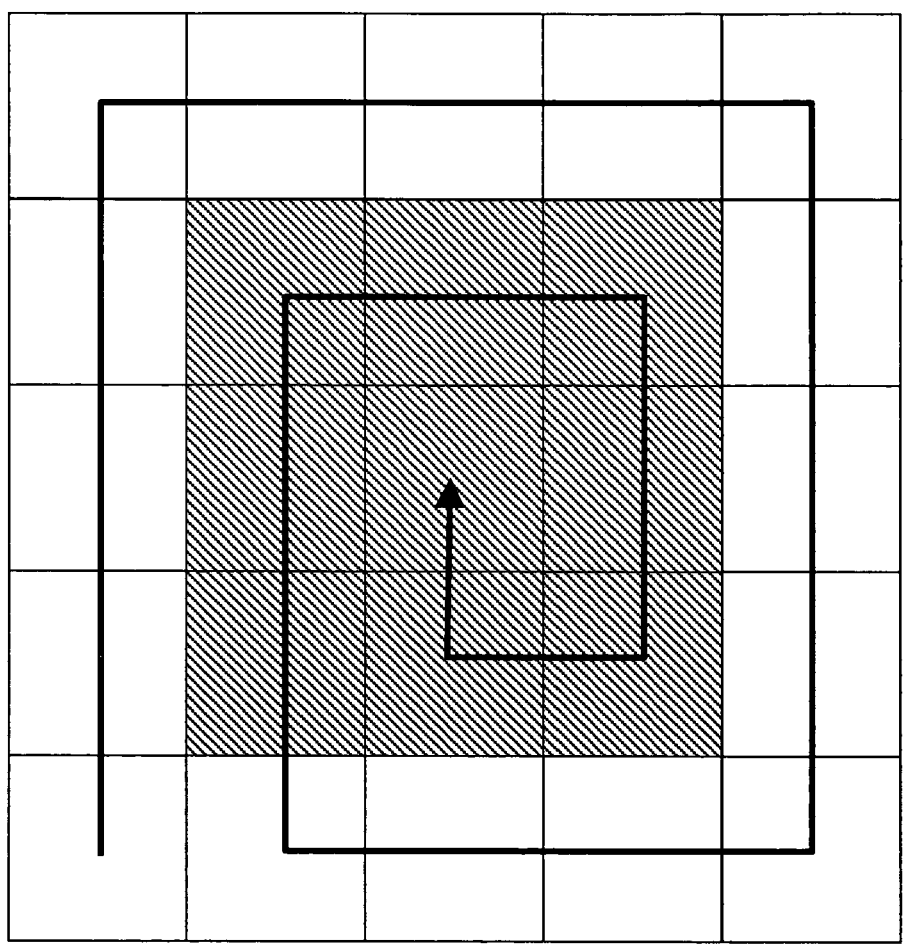
FIG. 4 is a block diagram of an example scan order for concealing intra-frame errors.

FIG. 4 shows the general concept for an example 5×5 block. The pixels are arranged in a rectangular array. First, the (unshaded) pixels along the outer boundary are concealed using nearest candidate pixels along outer boundaries of adjacent blocks, as in the prior art, i.e., the nearest pixels directly above, below, to the left and to the right of the current pixel, but along the outer boundary of adjacent blocks.

Then, then the remaining (shaded) inner pixels are concealed using previously concealed nearest pixels in the same macroblock. Here the concealment scanning order is in a spiral manner towards the middle of the block.

Figure 5:
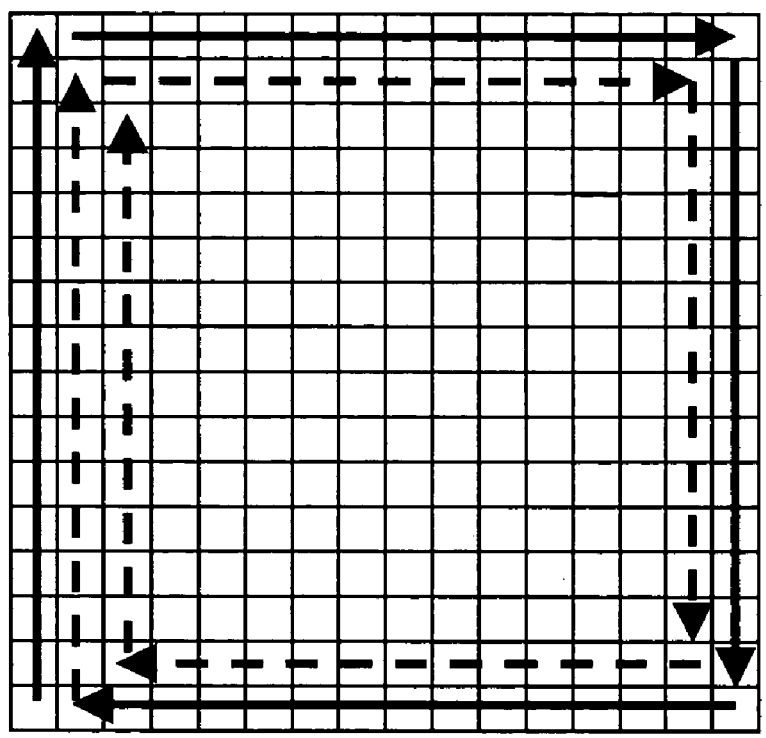
FIG. 5 is a block diagram of a example scan order for concealing intra-frame error for a 16×16 macroblock.

FIG. 5 shows the process for a 16×16 macroblock, with the solid arrows indicating the pixels concealed using pixels of adjacent blocks, and the dashed arrows using pixels from the same block.

Figure 6:
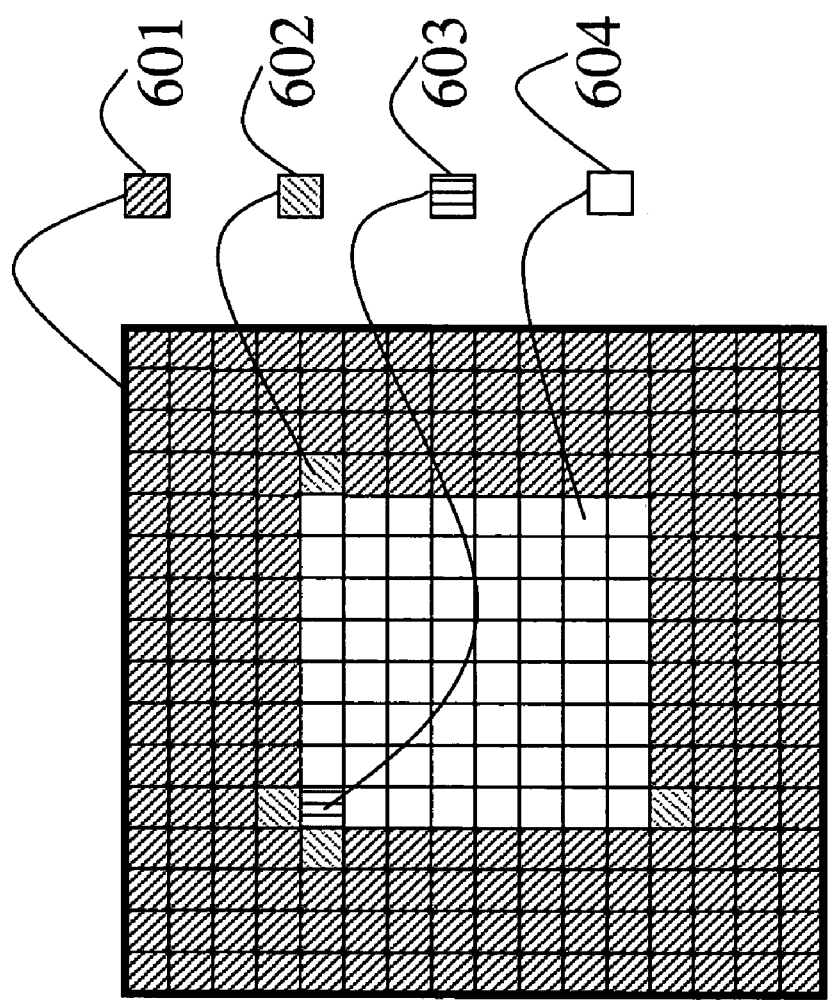
FIG. 6 is a block diagram of concealing an internal pixel of a lost block according to the invention.

FIG. 6 shows the concealment for a specific current pixel 603. Pixels 601 have already been concealed. Pixels 602 are the nearest candidate pixels to be used to restore the current pixel 603. As above, the nearest candidate pixels are directly above, below, to the left and to the right of the current pixel, but in this case, the candidate pixels are previously concealed pixels in the lost block. Pixels 604 are lost pixels yet to be concealed.

The estimated value to be used for concealing the current pixel 603 are determined as follows. The estimation is based on the fact that the current pixel to be estimated and a candidate pixel 602 have high correlation when they are near each other, and have low correlation when they are far away. The distance metric is measured by the number of pixels from the current pixel to the candidate pixel.

First, sort the candidate pixels $C_i$ in ascending order in terms their intensity values.

Determine the median intensity value of the ordered candidate pixels.

Find a difference $Diff_i$ between the value of the $i^{th}$ candidate pixel and the median intensity value.

Find a distance $Dist_i$ between the $i^{th}$ candidate pixel and the current pixel.

Determine an evaluation score $S_i$ for the $i^{th}$ candidate pixel as sum of $Diff_i$ and $Dist_i$.

If $S_i$ is greater than a threshold T, then the $i^{th}$ candidate pixel is rejected in the interpolation.

Linearly interpolate remaining candidate pixels and assign the interpolated value to the current pixel p according to $$p = \left(\sum_i \frac{C_i}{Dist_i}\right) \bigg/ \left(\sum_i \frac{1}{Dist_i}\right).$$

The threshold T controls the smoothness and sharpness of the concealed macroblock. A threshold of 20 yields good results.

For example, the sorted four candidate pixels 602 are
$C_1=15$, $C_2=20$, $C_3=30$, $C_4=60$
The median of the four candidate pixels is $(20+30)/2=15$
$Diff_1=0$, $Diff_2=5$, $Diff_3=15$, $Diff_4=45$
$Dist_1=1$, $Dist_2=1$, $Dist_3=8$, $Dist_4=8$
$S_1=1$, $S_2=6$, $S_3=23$, $S_4=53$
Threshold=20, therefore candidates $C_3$ and $C_4$ are rejected
$p=(C_1/Dist_1+C_2/Dist_2)/(1/Dist_1+1/Dist_2)=(15/1+20/1)/(1/1+1/1)=18$ Because pixels are spatially correlated in intra-frames, candidate pixels with small distance to the current pixel obtain a high weight in the interpolating operation. Therefore, the weighting coefficient is set to $1/Dist_i$, which is inverse proportional to the distance between the current pixel and the candidate pixel.

When the number of the useful neighboring pixels is reduces to two, the lost pixel is always interpolated by the two nearest error-free pixels without conditional rejection.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for encoding an inter-frame of a compressed video, the inter-frame including a plurality of macroblocks in a predetermined order, each macroblock having an associated motion vector, comprising:
    identifying, for each current macroblock in the predetermined order, a set of near macroblocks;
    assigning an index to each near macroblock;
    determining a difference between the motion vector of the current macroblock and the motion vector of each near macroblocks;
    sorting the indices of the near macroblocks in order of the differences;
    appending the sorted indices to the inter-frame, in which the sorted indices are identified by a separation code in the inter-frame.

2. The method of claim 1, in which the set of near macroblocks are immediately adjacent to the current macroblock.

3. The method of claim 2, in which macroblocks immediately adjacent to the set of near macroblocks are included in the set.

4. The method of claim 1, in which the order is a raster scan order.

5. The method of claim 1, in which the difference is in terms of a mean squared error.

6. The method of claim 1, in which the difference is in terms of an absolute error.

7. The method of claim 1, further comprising:
transmitting the inter-frame through a noisy channel;
decoding the transmitted inter-frame;
detecting a lost macroblock in the decoded inter-frame;
reading the sorted indices corresponding the lost macroblock;
concealing the lost macroblock by one of the motion vectors identified in the sorted indices.

8. The method of claim 7, in which the one motion vector is a received motion vector with a smallest difference to the motion vector of the lost macroblock.

9. The method of claim 1, in which macroblocks along edges of the inter-frame are replicated adjacently on an outside of the inter-frame to facilitate processing of edge blocks of the current macroblock.

* * * * *